(12) United States Patent
Chang et al.

(10) Patent No.: US 8,356,136 B2
(45) Date of Patent: Jan. 15, 2013

(54) BLOCK MANAGEMENT METHOD OF A NON-VOLATILE MEMORY

(75) Inventors: Yuan-Hao Chang, Taipei (TW); Tei-Wei Kuo, Taipei (TW)

(73) Assignee: National Taiwan University, Taipei (TW)

( * ) Notice: Subject to any disclaimer, the term of this patent is extended or adjusted under 35 U.S.C. 154(b) by 392 days.

(21) Appl. No.: 12/702,254

(22) Filed: Feb. 8, 2010

(65) Prior Publication Data
US 2011/0161563 A1   Jun. 30, 2011

(30) Foreign Application Priority Data
Dec. 24, 2009 (TW) .............................. 98144803 A

(51) Int. Cl.
*G06F 12/02* (2006.01)
*G06F 12/10* (2006.01)

(52) U.S. Cl. . 711/103; 711/165; 711/203; 711/E12.008; 711/E12.009; 711/E12.058

(58) Field of Classification Search ........................ None
See application file for complete search history.

(56) References Cited

U.S. PATENT DOCUMENTS

| | | | |
|---|---|---|---|
| 2005/0013154 A1* | 1/2005 | Honda et al. ................. | 365/145 |
| 2005/0144360 A1* | 6/2005 | Bennett et al. ................ | 711/103 |
| 2005/0166087 A1* | 7/2005 | Gorobets ........................ | 714/7 |
| 2006/0161722 A1* | 7/2006 | Bennett et al. ................ | 711/103 |
| 2007/0168632 A1* | 7/2007 | Zeevi et al. ................... | 711/165 |
| 2008/0126712 A1* | 5/2008 | Mizushima .................... | 711/141 |
| 2008/0201518 A1* | 8/2008 | Kim et al. ...................... | 711/103 |
| 2010/0131736 A1* | 5/2010 | Lee et al. ....................... | 711/202 |
| 2011/0072199 A1* | 3/2011 | Reiter et al. ................... | 711/103 |

OTHER PUBLICATIONS

Jongmin Lee et al. "Block Recycling Schemes and Their Cost-based Optimization in NAND Flash Memory Based Storage System." Oct. 2007. ACM. EMSOFT'07.*
Andrew Birrell et al. "A Design for High-Performance Flash Disks." Apr. 2007. ACM. Operating Systems Review. vol. 41. pp. 88-93.*
Jeong-Uk Kang et al. "A Superblock-based Flash Translation Layer for NAND Flash Memory." Oct. 2006. ACM. EMSOFT'06.*
Po-Liang Wu et al. "A File-System-Aware FTL Design for Flash-Memory Storage Systems." Apr. 2009. IEEE. Date '09.*
Wu et al., "An Efficient B-Tree Layer Implementation for Flash-Memory Storage Systems," ACM Transactions on Embedded Computing Systems, vol. 6, No. 3, Article 19, Jul. 2007, pp. 1-23.

(Continued)

*Primary Examiner* — Nathan Sadler
(74) *Attorney, Agent, or Firm* — Jianq Chyun IP Office

(57) ABSTRACT

A block management method applicable to a non-volatile memory storage system is provided. The non-volatile memory storage system includes a plurality of chips. Each chip includes a plurality of physical blocks. The physical blocks form a plurality of physical block sets. Each logical block in a logical space corresponds to at most two physical block sets. In the block management method, when a logical block corresponds to two physical block sets filled with data and more data is to be written, a free physical block set is allocated for storing the data. Then, one of the two physical block sets corresponding to the logical block is selected according to a predetermined criterion. The valid data in the selected physical block set is copied into the free physical block set. Next, the selected physical block set is erased and collected to the pool of free physical block sets.

15 Claims, 5 Drawing Sheets

OTHER PUBLICATIONS

Wu et al. "An Adaptive Two-Level Management for the Flash Translation Layer in Embedded Systems," ICCAD '06, Nov. 5-9, 2006, pp. 601-606.

Park et al., "CFLRU: A Replacement Algorithm for Flash Memory," CASES'06, Oct. 23-25, 2006, Seoul, Korea, pp. 234-241.

Chang et al., "A Commitment-based Management Strategy for the Performance and Reliability Enhancement of Flash-memory Storage Systems," DAC'09, Jul. 26-31, 2009, San Francisco, CA, USA, pp. 858-863.

Kgil et al., "FlashCache: A NAND Flash Memory File Cache for Low Power Web Servers," Advanced Computer Architecture Laboratory, The University of Michigan, Oct. 23-25, 2006, pp. 103-112.

Kim et al., "LGeDBMS: a Small DBMS for Embedded System with Flash Memory," LG Electronics Institute of Technology, Sep. 12-15, 2006, pp. 1255-1258.

Chang et al., "An Efficient Management Scheme for Large-Scale Flash-Memory Storage Systems," 2004 ACM Symposium on Applied Computing, Mar. 14-17, 2004, pp. 862-868.

Jo et al., "FAB Flash-Aware Buffer Management Policy for Portable Media Players," IEEE Transactions on Consumer Electronics, May 2006, pp. 485-493.

Kim et al., "BPLRU: A Buffer Management Scheme for Improving Random Writes in Flash Storage," FAST '08: 6th USENIX Conference on File and Storage Technologies, Feb. 29, 2008, pp. 239-252.

\* cited by examiner

BLOCK MANAGEMENT METHOD OF A NON-VOLATILE MEMORY

CROSS-REFERENCE TO RELATED APPLICATION

This application claims the priority benefit of Taiwan application Ser. No. 98144803, filed on Dec. 24, 2009. The entirety of the above-mentioned patent application is hereby incorporated by reference herein and made a part of specification.

BACKGROUND OF THE INVENTION

1. Field of the Invention

The present invention generally relates to a non-volatile memory storage system, and more particularly, to a block management method of a non-volatile memory.

2. Description of Related Art

The low fabrication cost of flash memory has been a major motivation in the development of flash memory. A flash memory chip is composed of blocks, and each of the blocks is further composed of pages. Each block is the basic data erasing unit, while each page is the basic data accessing unit. Once data is written into a page, no other data can be written into the same page until the block corresponding to the page is entirely erased. Thus, data is usually written into free pages instead of the original pages in consideration of the performance. Accordingly, a logical block address (LBA) and physical address translation mechanism or information is required to locate data corresponding to each LBA.

Flash memories can be categorized into low-cost multi-level cell (MLC) flash memories and conventional single-level cell (SLC) flash memories with higher cost. Different mechanisms for managing the data storage space of flash memory have been provided. However, the performance of flash memory decreases along with the fabrication cost thereof. Additionally, two restrictions on writing data into MLC flash memory have been newly established. One restriction is that each page can only be written once, and the other restriction is that the pages in each block have to be written in sequence. Thereby, the conventional management mechanisms are either incapable of managing low-cost MLC flash memory or very inefficient in doing so.

In order to improve the access efficiency of the entire system, some special methods for managing data to be written in small quantities have been provided. In addition, some adaptable address translation mechanisms for managing flash memory storage systems with large capacities have been further provided in order to improve the scalability of the management mechanisms. In some other mechanisms, a write buffer is adopted in order to improve the efficiency of writing data into a flash memory. However, in a storage system adopting such a mechanism, data may be lost when the system fails or the power supply is cut off. As a result, the storage system lacks data consistency.

SUMMARY OF THE INVENTION

Accordingly, the present invention is directed to a non-volatile memory block management method that can improve the overall performance of a non-volatile memory storage system.

The present invention provides a non-volatile memory block management method applicable to a non-volatile memory storage system. The non-volatile memory storage system includes a plurality of hardware channels and a plurality of non-volatile memory chips. Each of the hardware channels is coupled to one or more of the non-volatile memory chips. Each of the non-volatile memory chips includes a plurality of physical blocks. The non-volatile memory storage system includes a plurality of physical block sets. Each of the physical block sets includes a plurality of physical blocks. Each physical block in the same physical block set belongs to different ones of the non-volatile memory chips. The non-volatile memory block management method includes following steps. (a) When data is written into a logical block in a logical space, a free first physical block set is allocated among the physical block sets for storing the data. (b) When the first physical block set is full and more data is to be written into the same logical block, a free second physical block set is allocated among the physical block sets for storing the data. (c) When the second physical block set is full and more data is to be written into the same logical block, a free third physical block set is allocated among the physical block sets for storing the data. One of the first physical block set and the second physical block set is selected according to a predetermined criterion. Valid data in the selected physical block set is copied to the third physical block set, and then the selected physical block set is erased and collected.

According to an embodiment of the present invention, each of the non-volatile memory chips is a multi-level cell (MLC) flash memory chip.

According to an embodiment of the present invention, the predetermined criterion is selecting one of the first physical block set and the second physical block set that has less valid data.

According to an embodiment of the present invention, the step (a) further includes setting the first physical block set as a new physical block set corresponding to the logical block. The step (b) further includes setting the second physical block set as a new physical block set corresponding to the logical block and setting the first physical block set as an old physical block set corresponding to the logical block. The step (c) further includes setting the third physical block set as a new physical block set corresponding to the logical block and setting the unselected one of the first physical block set and the second physical block set as an old physical block set corresponding to the logical block.

According to an embodiment of the present invention, each of the physical blocks includes a plurality of physical pages. The step (b) further includes storing a first pointer in the spare area of each of the physical pages in the second physical block set, wherein the first pointer points to the first physical block set. The step (c) further includes storing a second pointer in the spare area of each of the physical pages in the third physical block set, wherein the second pointer points to the unselected one of the first physical block set and the second physical block set.

According to an embodiment of the present invention, the number of physical block sets in the non-volatile memory storage system is greater than the number of logical blocks in the logical space.

According to an embodiment of the present invention, the non-volatile memory block management method further includes the following steps. The number of free physical block sets in the non-volatile memory storage system is checked. If the number is lower than a predetermined value, the number of physical block sets corresponding to each logical block in the logical space is further checked. If a logical block in the logical space corresponds to two physical block sets, a new physical block set is allocated among the free physical block sets. Then, valid data in the two physical block sets corresponding to the logical block is combined and copied to the new physical block set, and the two physical block sets corresponding to the logical block are erased and collected.

According to an embodiment of the present invention, each of the physical blocks includes a plurality of physical pages. Each of the physical block sets includes a plurality of physical page sets. Each of the physical page sets includes a plurality of physical pages. Each physical page of the same physical page set respectively belongs to different blocks in the physical block set containing the particular physical page set. The physical pages in the same physical page set have the same block relative position.

According to an embodiment of the present invention, each of the physical block sets is a data erase unit, and each of the physical page sets is a data access unit.

According to an embodiment of the present invention, the non-volatile memory block management method further includes following steps. When the first physical block set excluding a predetermined physical page set is filled with data, an address translation table recording logical block addresses (LBAs) and physical block addresses (PBAs) of valid data in the first physical block set is written into the predetermined physical page set of the first physical block set. When the second physical block set excluding a predetermined physical page set is filled with data, an address translation table recording LBAs and PBAs of valid data in the first physical block set and the second physical block set is written into the predetermined physical page set of the second physical block set.

According to an embodiment of the present invention, the predetermined criterion is selecting one of the first physical block set and the second physical block set according to valid data quantities of the first physical block set and the second physical block set, wherein the valid data quantities are determined according to the address translation tables in the first physical block set and the second physical block set.

According to an embodiment of the present invention, the total data storage space of a logical block in the logical space is equal to the total data storage space of a physical block set in the non-volatile memory storage system excluding the predetermined physical page set of the physical block set.

According to an embodiment of the present invention, the predetermined physical page set is the last physical page set in the physical block set containing the predetermined physical page set.

As described above, the technique provided by the present invention improves the garbage collection performance of a non-volatile memory storage system. In addition, according to the present invention, the address translation table contained in each predetermined lined physical page set helps to increase the boot up speed. Moreover, pointers between physical block sets corresponding to the same logical block help to speed up the recovery from system crash or power failure.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
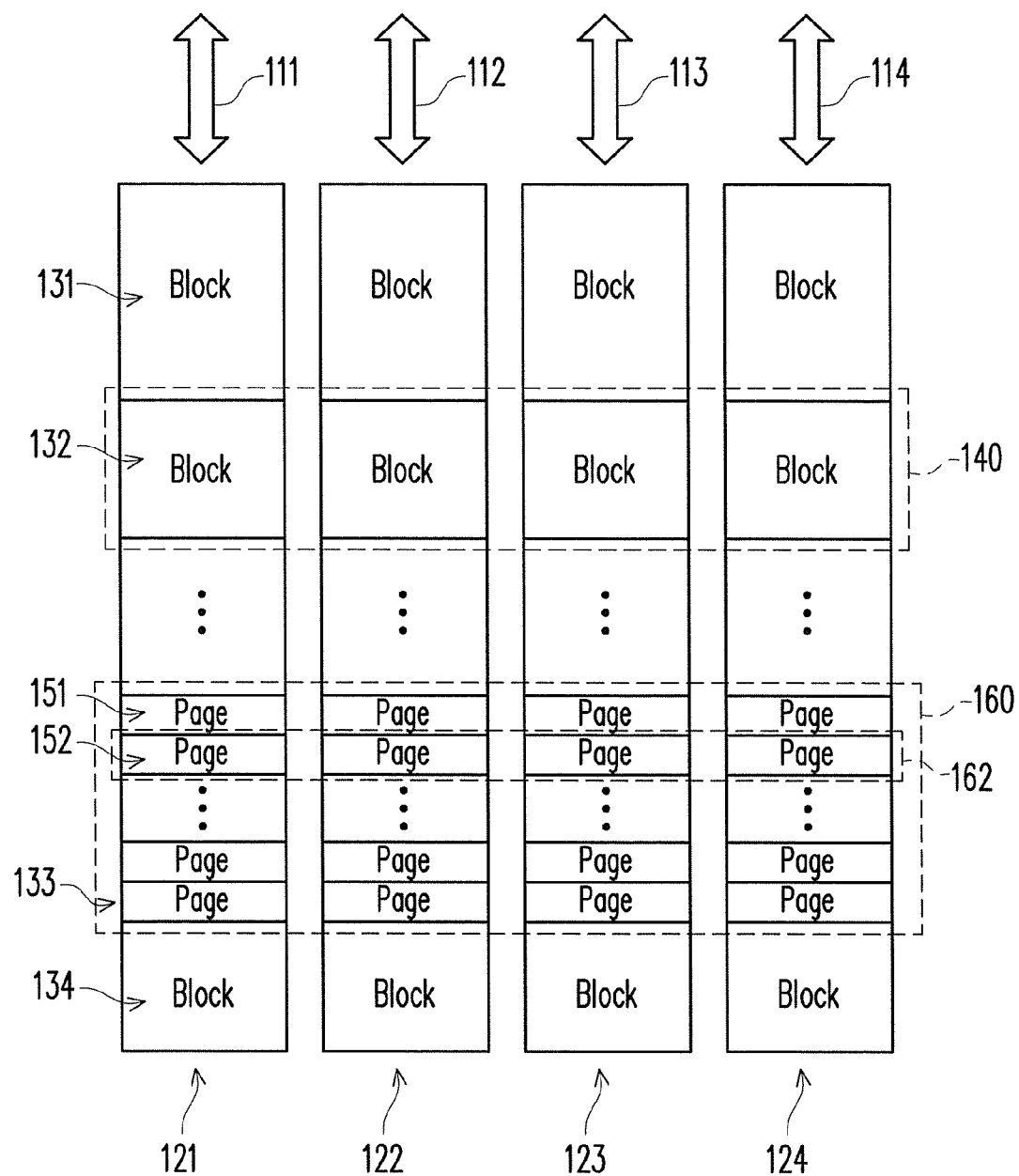
FIG. 1 is a schematic diagram of a non-volatile memory storage system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a non-volatile memory storage system according to an embodiment of the present invention. Referring to FIG. 1, the non-volatile memory storage system includes hardware channels 111-114 and non-volatile memory chips 121-124. The hardware channels 111-114 are buses configured to transmit memory data and control signals. In the present embodiment, the non-volatile memory chips 121-124 are multi-level cell (MLC) flash memory chips. However, the present invention is not limited thereto, and in other embodiments of the present invention, the non-volatile memory chips 121-124 may also be other types of non-volatile memory chips. Each of the hardware channels 111-114 is coupled to one of the non-volatile memory chips 121-124. The non-volatile memory storage system illustrated in FIG. 1 includes only four non-volatile memory chips. However, the present invention is not limited thereto, and in other embodiments of the present invention, the non-volatile memory storage system may include more non-volatile memory chips, and each hardware channel may be coupled to one or multiple non-volatile memory chips.

As shown in FIG. 1, each of the non-volatile memory chips 121-124 includes a plurality of physical blocks. For example, the non-volatile memory chip 121 includes physical blocks 131, 132, 133, and 134. In the non-volatile memory storage system illustrated in FIG. 1, a plurality of physical block sets is defined. Each of the physical block sets includes a plurality of physical blocks. Each physical block in the same physical block set belongs to different non-volatile memory chips. For example, the physical block set 140 includes four physical blocks, wherein the four physical blocks respectively belong to the non-volatile memory chips 121-124. This applies to the physical block set 160 as well. In other embodiments of the present invention, each hardware channel may be coupled to multiple non-volatile memory chips, and in this case, the physical blocks in each physical block set respectively belong to non-volatile memory chips coupled to different hardware channels.

As shown in FIG. 1, each physical block includes a plurality of physical pages. For example, the physical pages 151 and 152 are two of the physical pages of the physical block 133. Each page has a data area and a spare area, wherein the data area stores data and the spare area stores management information. Each physical block set includes a plurality of physical page sets, and each of the physical page sets includes a plurality of physical pages. The physical pages in each physical page set respectively belong to different blocks in the physical block set corresponding to the physical page set, and the physical pages in the physical page set have the same block relative position. For example, the physical pages in the physical page set 162 of the physical block set 160 are the second physical pages in the corresponding physical blocks.

Each of the physical block sets is a data erase unit, and each of the physical page sets is a data access unit. Because the hardware channels 111-114 can simultaneously access data, data in the physical page sets can be accessed in parallel through the hardware channels 111-114, so that the data access efficiency of the non-volatile memory storage system can be improved.

Not all the physical block sets are used for storing data. In the present embodiment, each physical block set has a predetermined physical page set for storing an address translation table, wherein the address translation table records logical block addresses (LBAs) and physical block addresses (PBAs) of data stored in the physical block set. In the present embodiment, the predetermined physical page set is the last physical page set in the physical block set containing the predetermined lined physical page set. However, in other embodiments of the present invention, the predetermined physical page set may also be other physical page sets.

In the present embodiment, the entire logical space is divided into continuous LBAs, and the continuous LBAs are grouped into logical blocks. Each logical block is corresponding to one or two physical block sets. The total data storage space of each logical block is equal to the total data storage space of each physical block set excluding the predetermined physical page set. Namely, a physical block set can accommodate all the data in a logical block. Because a logical block may be corresponding to two physical block sets, the number of physical block sets in the entire non-volatile memory storage system has to be greater than the number of logical blocks in the logical space.

Figure 2:
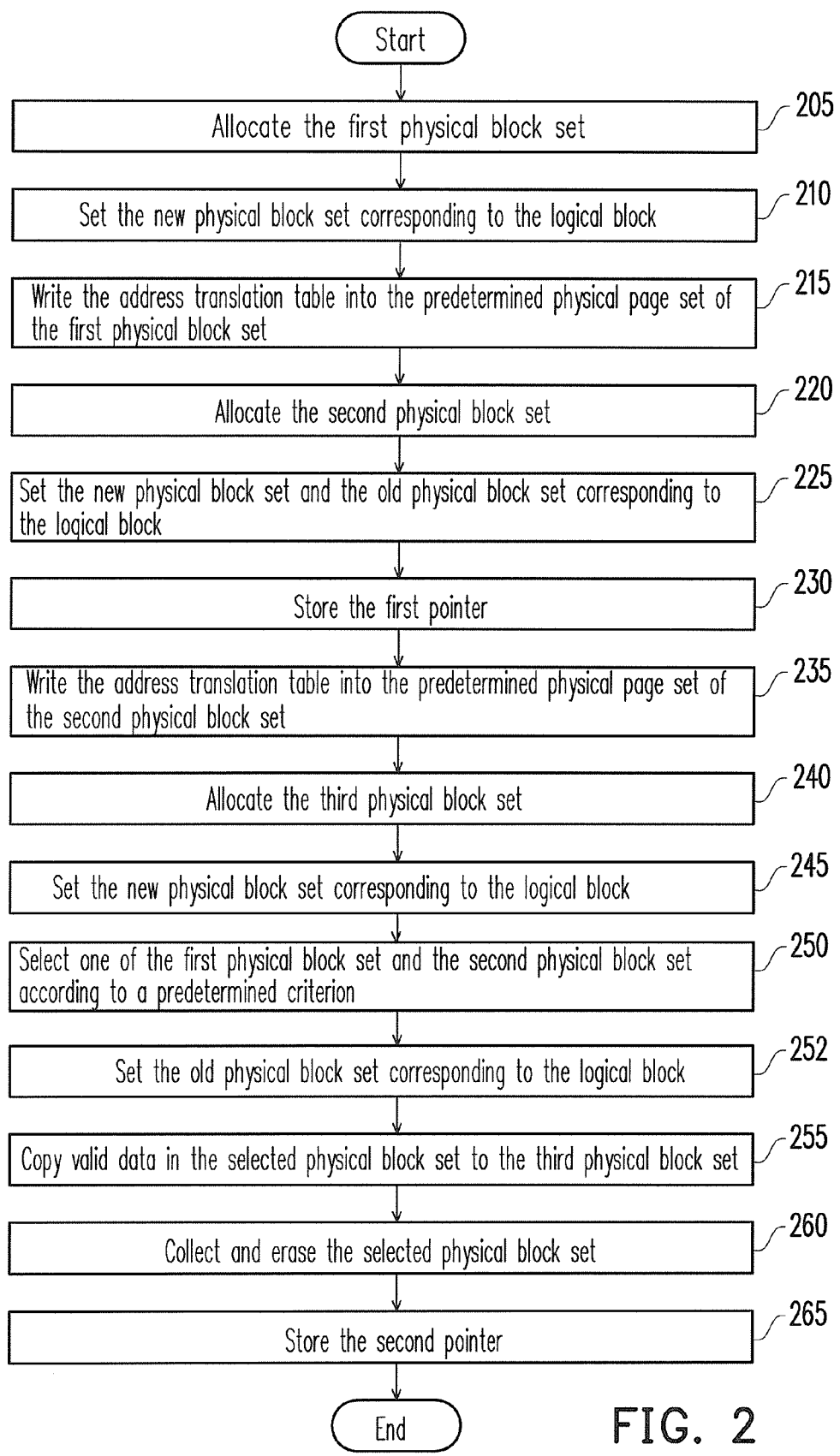
FIG. 2 is a flowchart of a non-volatile memory block management method according to an embodiment of the present invention.

FIG. 2 is a flowchart of a non-volatile memory block management method according to an embodiment of the present invention. The management method illustrated in FIG. 2 is applicable to the non-volatile memory storage system illustrated in FIG. 1. Below, this management method will be described in detail.

First, when data is written into a logical block in the logical space for the first time, a free first physical block set is allocated among the physical block sets of the non-volatile memory storage system for storing the data (step 205). Then, the first physical block set is set as a new physical block set corresponding to the logical block (step 210). Subsequently, data is sequentially written into the physical block set starting from the first physical page set.

When the first physical block set excluding the predetermined physical page set is filled with data, an address translation table recording LBAs and PBAs of valid data in the first physical block set is written into the predetermined physical page set of the first physical block set (step 215). In this case, the first physical block set is considered full of data. In the present embodiment, each physical block set has a predetermined physical page set for storing the address translation table of the corresponding logical block, so that when the system is booted up, it doesn't need to establish the address translation table by reading the LBA stored in the spare area of each physical page and the address translation table can be directly accessed. Accordingly, the boot up speed of the system is increased.

Herein the first physical block set is already filled with data, and if more data is to be written into the same logical block, a free second physical block set is then allocated among the physical block sets of the non-volatile memory storage system for storing the data (step 220). Next, the second physical block set is set as a new physical block set corresponding to the logical block and the first physical block set is set as an old physical block set corresponding to the logical block (step 225). After that, a first pointer is stored in the spare area of each physical page in the second physical block set, wherein the first pointer points to the first physical block set (step 230).

Thereafter, when the second physical block set excluding the predetermined physical page set is filled with data, an address translation table recording the LBAs and PBAs of valid data in the first physical block set and the second physical block set is written into the predetermined physical page set of the second physical block set (step 235). Herein the second physical block set is already filled with data, and if more data is to be written into the same logical block, a free third physical block set is allocated among the physical block sets of the non-volatile memory storage system for storing the data (step 240). After that, the third physical block set is set as a new physical block set corresponding to the logical block (step 245).

Next, one of the first physical block set and the second physical block set is selected according to a predetermined criterion (step 250). In the present embodiment, the predetermined criterion is to select one of the first physical block set and the second physical block set according to the valid data quantities of the first physical block set and the second physical block set (for example, one of the first physical block set and the second physical block set having less valid data is selected). Valid data is in unit of pages. Because the LBAs recorded in the address translation tables in the predetermined physical page sets of the first physical block set and the second physical block set correspond to the valid data, the valid data quantities of the first physical block set and the second physical block set can be determined according to the address translation tables in the first physical block set and the second physical block set. In addition, as to the MLC flash memories in the present embodiment, the valid data quantities of the physical block sets can be obtained even without the address translation tables by simply checking all the LBAs in the spare areas of the physical pages of the physical block sets. Since data can only be sequentially written into a MLC flash memory in unit of pages, only the last physical page among all the physical pages having the same LBA contains valid data while all the other physical pages contain invalid data.

After selecting one of the first physical block set and the second physical block set according to the predetermined criterion, the unselected one of the first physical block set and the second physical block set is set as an old physical block set corresponding to the logical block (step 252). Valid data in the selected physical block set is copied to the free third physical block set (step 255), and the selected physical block set is then erased and collected as a free physical block set (step 260). Meanwhile, a second pointer is stored in the spare area of each physical page in the third physical block set, wherein the second pointer points to the unselected one of the first physical block set and the second physical block set (step 265).

Each logical block corresponds to at most two physical block sets. Subsequently, one of the two original physical block sets corresponding to the logical block is erased and collected every time when a new physical block set is allocated through the procedure described above, so that the logical block always corresponds to at most two physical block sets.

Figure 3:
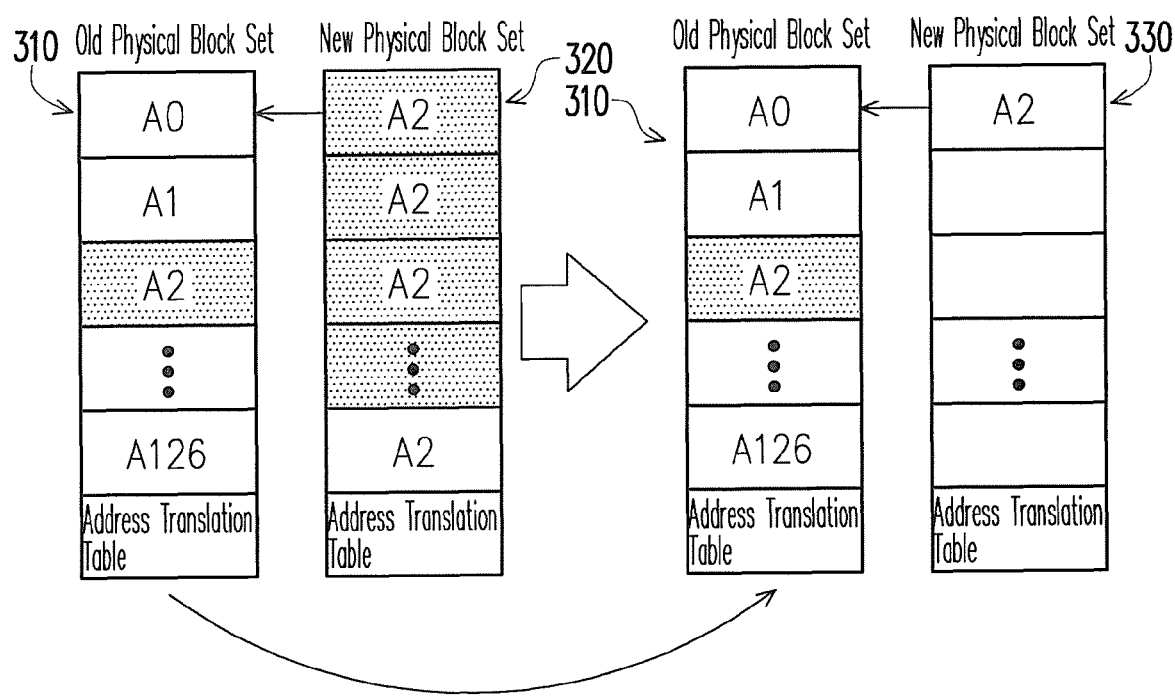
FIG. 3 and FIG. 4 illustrate examples of the non-volatile memory block management method in FIG. 2.

FIG. 3 illustrates an example of the non-volatile memory block management method in FIG. 2. Referring to FIG. 3, the reference numeral 310 refers to an old physical block set corresponding to a specific logical block, the reference numeral 320 refers to a new physical block set corresponding to the logical block, and A0-A126 refer to the LBAs corresponding to the physical page sets. Data of small quantities has been randomly written into the logical block for some times and accordingly many physical page sets contain invalid data corresponding to the LBA A2 (denoted with dotted blocks). When the physical block sets 310 and 320 are both filled with data and more data is to be written, in the non-volatile memory block management method illustrated in FIG. 2, the physical block set 320 having less valid data is selected, and the valid data in the physical block set 320 is copied to the newly allocated free physical block set 330. In the present example, only the second-to-last physical page set of the physical block set 320 contains valid data. After that, the physical block set 320 is erased and collected.

Figure 4:
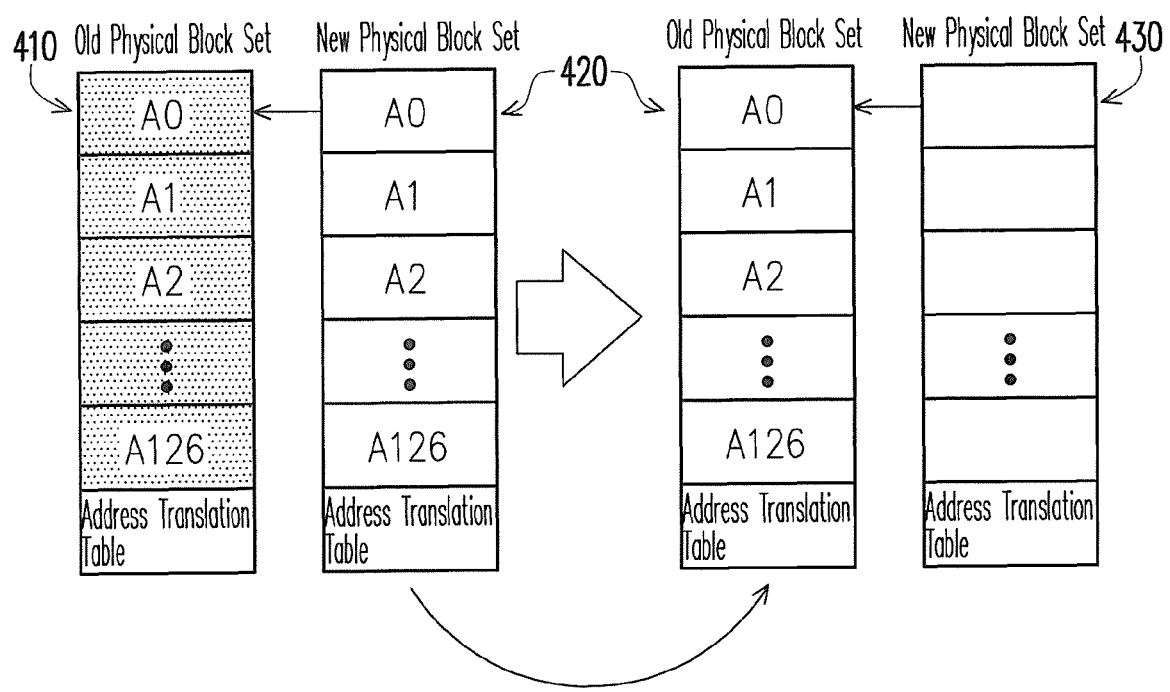

FIG. 4 illustrates an example of the non-volatile memory block management method in FIG. 2. Referring to FIG. 3, the reference numeral 410 refers to an old physical block set corresponding to a specific logical block, the reference numeral 420 refers to a new physical block set corresponding to the logical block, and A0-A126 refer to the LBAs corresponding to the physical page sets. Data in large quantities has been sequentially written into the logical block illustrated in FIG. 4 twice. Thus, data stored in the old physical block set 410 is all invalid (denoted with dotted blocks), and data in the new physical block set 420 is all valid. When the physical block sets 410 and 420 are both filled with data and more data is to be written, in the non-volatile memory block management method illustrated in FIG. 2, the physical block set 410 having less valid data is selected, and the valid data in the physical block set 410 is copied to the newly allocated free physical block set 430. In the present example, the physical block set 410 contains no valid data to be copied. After that, the physical block set 410 is erased and collected.

It can be understood based on the examples illustrated in FIG. 3 and FIG. 4 that the block management method in the present embodiment can be automatically adjusted so that a good performance can be always achieved in either random data writing or sequential data writing. When a random data writing operation is performed (for example, a file attribute, system information of a file system, or a small system file is written), most valid data is kept in the old physical block set corresponding to the logical block. When a sequential data writing operation is performed (for example, a multimedia file is written), the valid data is usually kept in the new physical block set corresponding to the logical block. In the block management method provided by the present embodiment, a physical block set containing less valid data is automatically selected and erased, so that a good garbage collection performance can be achieved in either random data writing or sequential data writing.

Regarding the steps 230 and 265 illustrated in FIG. 2, a pointer is stored in a physical block set corresponding to a logical block, wherein the pointer points to a previous physical block set corresponding to the same logical block. If a logical block is already corresponding to two physical block sets and system or power failure occurs after a third physical block set is allocated and before the physical block set having less valid data is erased and collected, the logical block will be incorrectly corresponding to three physical block sets. If such an error is found when the system is booted up again, the order of the three physical block sets can be instantly determined through the pointers and the unfinished block replacement action before the system or power failure can be continued. Thereby, instant data recovery and system recovery can be achieved.

Figure 5:
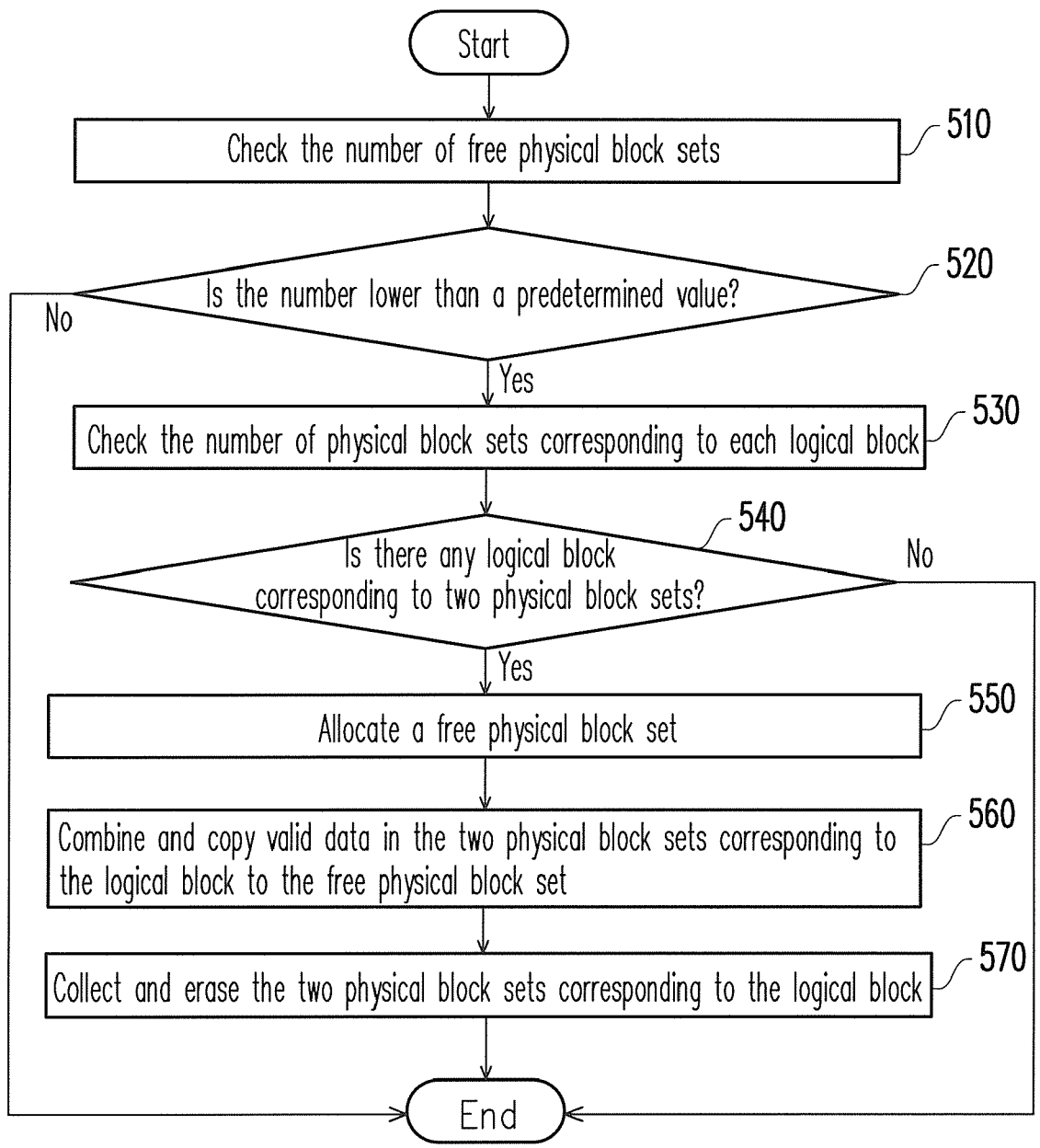
FIG. 5 is a flowchart of a garbage collection method according to an embodiment of the present invention.

FIG. 5 is a flowchart of a garbage collection method according to an embodiment of the present invention. The garbage collection method illustrated in FIG. 5 can be integrated and executed together with the block management method illustrated in FIG. 2. Below, the garbage collection method in FIG. 5 will be described in detail.

First, the number of free physical block sets in the non-volatile memory storage system is checked (step 510). Then, whether the number is lower than a predetermined value is determined (step 520). If the number is not lower than the predetermined value, which means there are still sufficient free physical block sets in the system and no garbage collection is necessary, the procedure ends here. If the number of free physical block sets is lower than the predetermined lined value, the number of physical block sets corresponding to each logical block in the logical space is further checked (step 530). Next, whether there is any logical block corresponding to two physical block sets is determined (step 540). If there is no such a logical block, it is determined that there is no more space in the system to be collected and the procedure ends here. If a logical block in the logical space is corresponding to two physical block sets, a free physical block set is allocated in the non-volatile memory storage system to be corresponded to the logical block (step 550). Valid data in the two physical block sets corresponding to the logical block is combined and copied to the free physical block set (step 560). After that, the two physical block sets corresponding to the logical block are erased and collected (step 570). Because two physical block sets are released with the allocation of every free physical block set, the garbage collection method illustrated in FIG. 5 can collect the space taken by infrequently updated data, so that the space efficiency of the non-volatile memory storage system is increased.

As described above, in the non-volatile memory block management method provided by the present embodiment, data is accessed in parallel through a plurality of hardware channels of the non-volatile memory storage system, so that the data access efficiency is improved. Additionally, in the non-volatile memory block management method, the physical block set containing less valid data is automatically erased and collected, so that the quantity of valid data to be copied is reduced to its minimum and the performance of garbage collection is improved, and accordingly a good efficiency can be achieved in either random data writing or sequential data writing. Each physical block set has a predetermined physical page set for storing address translation table of the corresponding logical block, such that the boot up speed of the system is increased. If a system or power failure occurs, the original order of physical block sets corresponding to the same logical block can be instantly determined according to pointers between these physical block sets, so that data and the system can be instantly recovered. Moreover, in the garbage collection method provided by the present embodiment, an extra free physical block set is obtained every time when valid data in two physical block sets is combined. Thus, the worst-case execution time of garbage collection can be easily determined, which is very advantageous to a real-time system.

It will be apparent to those skilled in the art that various modifications and variations can be made to the structure of the present invention without departing from the scope or spirit of the invention. In view of the foregoing, it is intended that the present invention covers modifications and variations of this invention provided, they fall within the scope of the following claims and their equivalents.

What is claimed is:

1. A non-volatile memory block management method, applicable to a non-volatile memory storage system, wherein the non-volatile memory storage system comprises a plurality of hardware channels and a plurality of non-volatile memory chips; each of the hardware channels is coupled to one or more of the non-volatile memory chips; each of the non-volatile memory chips comprises a plurality of physical blocks, each of the physical blocks comprises a plurality of physical pages; the non-volatile memory storage system comprises a plurality of physical block sets; each of the physical block sets comprises a plurality of physical blocks; each of the physical blocks in the same physical block set belongs to different ones of the non-volatile memory chips; the non-volatile memory block management method comprises:

(a) when data is written into a logical block in a logical space for a first time, allocating a free first physical block set among the physical block sets for storing the data;

(b) when the first physical block set is full and more data is to be written into the logical block, allocating a free second physical block set among the physical block sets for storing the data and storing a first pointer into a spare area of each of the physical pages of the second physical block set, wherein the first pointer points to the first physical block set; and (c) when the second physical block set is full and more data is to be written into the logical block, allocating a free third physical block set among the physical block sets for storing the data, selecting one of the first physical block set and the second physical block set according to a predetermined criterion, copying valid data in the selected physical block set to the third physical block set, erasing and collecting the selected physical block set, and storing a second pointer into a spare area of each of the physical pages of the third physical block set, wherein the second pointer points to the unselected one of the first physical block set and the second physical block set.

2. The non-volatile memory block management method according to claim 1, wherein each of the non-volatile memory chips is a multi-level cell (MLC) flash memory chip.

3. The non-volatile memory block management method according to claim 1, wherein the predetermined criterion is selecting the one of the first physical block set and the second physical block set that has less valid data.

4. The non-volatile memory block management method according to claim 1, wherein the step (a) further comprises:
setting the first physical block set as a new physical block set corresponding to the logical block.

5. The non-volatile memory block management method according to claim 1, wherein the step (b) further comprises:
setting the second physical block set as a new physical block set corresponding to the logical block; and
setting the first physical block set as an old physical block set corresponding to the logical block.

6. The non-volatile memory block management method according to claim 1, wherein the step (c) further comprises:
setting the third physical block set as a new physical block set corresponding to the logical block; and
setting the unselected one of the first physical block set and the second physical block set as an old physical block set corresponding to the logical block.

7. The non-volatile memory block management method according to claim 1, wherein the number of the physical block sets in the non-volatile memory storage system is larger than the number of logical blocks in the logical space.

8. The non-volatile memory block management method according to claim 1, further comprising:
checking the number of free physical block sets in the non-volatile memory storage system;
if the number is lower than a predetermined value, checking the number of the physical block sets corresponding to each of the logical blocks in the logical space; and
if one of the logical blocks in the logical space is corresponding to two physical block sets, allocating a fourth physical block set among the free physical block sets, combining and copying valid data in the two physical block sets corresponding to the logical block to the fourth physical block set, and erasing and collecting the two physical block sets corresponding to the logical block.

9. The non-volatile memory block management method according to claim 1, wherein each of the physical block sets comprises a plurality of physical page sets, each of the physical page sets comprises a plurality of physical pages, each of the physical pages of the same physical page set respectively belongs to different blocks in the physical block set containing said physical page set, and the physical pages in said physical page set have a same block relative position.

10. The non-volatile memory block management method according to claim 9, wherein each of the physical block sets is a data erase unit, and each of the physical page sets is a data access unit.

11. The non-volatile memory block management method according to claim 9, further comprising:
when the first physical block set excluding a predetermined physical page set is filled with data, writing an address translation table recording logical block addresses (LBAs) and physical block addresses (PBAs) of valid data in the first physical block set into the predetermined physical page set of the first physical block set; and
when the second physical block set excluding a predetermined physical page set is filled with data, writing an address translation table recording LBAs and PBAs of valid data in the first physical block set and the second physical block set into the predetermined physical page set of the second physical block set.

12. The non-volatile memory block management method according to claim 11, wherein the predetermined criterion selects one of the first physical block set and the second physical block set according to valid data quantities of the first physical block set and the second physical block set, and the valid data quantities are determined according to the address translation tables in the first physical block set and the second physical block set.

13. The non-volatile memory block management method according to claim 11, wherein the total data storage space of a logical block in the logical space is equal to the total data storage space of a physical block set in the non-volatile memory storage system excluding the predetermined physical page set of the physical block set.

14. The non-volatile memory block management method according to claim 11, wherein the predetermined physical page set is the last physical page set in the physical block set containing the predetermined physical page set.

15. A non-volatile memory block management method, applicable to a non-volatile memory storage system, wherein the non-volatile memory storage system comprises a plurality of hardware channels and a plurality of non-volatile memory chips, each of the hardware channels is coupled to one or more of the non-volatile memory chips; each of the non-volatile memory chips comprises a plurality of physical blocks, the non-volatile memory storage system comprises a plurality of physical block sets, each of the physical block sets comprises a plurality of physical blocks, each of the physical blocks in the same physical block set belongs to different ones of the non-volatile memory chips; each of the physical blocks comprises a plurality of physical pages, each of the physical block sets comprises a plurality of physical page sets, each of the physical page sets comprises a plurality of physical pages, each of the physical pages of the same physical page set respectively belongs to different blocks in the physical block set containing said physical page set, and the physical pages in said physical page set have a same block relative position; the non-volatile memory block management method comprises:

when data is written into a logical block in a logical space for a first time, allocating a free first physical block set among the physical block sets for storing the data;

when the first physical block set is full and more data is to be written into the logical block, allocating a free second physical block set among the physical block sets for storing the data;

when the second physical block set is full and more data is to be written into the logical block, allocating a free third physical block set among the physical block sets for storing the data, selecting one of the first physical block set and the second physical block set according to a predetermined criterion, copying valid data in the selected physical block set to the third physical block set, and erasing and collecting the selected physical block set;

when the first physical block set excluding a predetermined physical page set is filled with data, writing an address translation table recording logical block addresses (LBAs) and physical block addresses (PBAs) of valid data in the first physical block set into the predetermined physical page set of the first physical block set; and when the second physical block set excluding a predetermined physical page set is filled with data, writing an address translation table recording LBAs and PBAs of valid data in the first physical block set and the second physical block set into the predetermined physical page set of the second physical block set.

\* \* \* \* \*